(12) United States Patent
Giebel et al.

(10) Patent No.: US 8,033,472 B2
(45) Date of Patent: Oct. 11, 2011

(54) ELECTRO-OPTICAL IMAGING READER HAVING PLURAL SOLID-STATE IMAGERS WITH SHUTTERS TO PREVENT CONCURRENT EXPOSURE

(75) Inventors: James Giebel, Centerport, NY (US); Edward Barkan, Miller Place, NY (US); Christopher Warren Brock, Manorville, NY (US); Mark Drzymala, Commack, NY (US); Igor Vinogradov, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 501 days.

(21) Appl. No.: 12/315,235

(22) Filed: Dec. 1, 2008

(65) Prior Publication Data

US 2009/0078775 A1    Mar. 26, 2009

Related U.S. Application Data

(63) Continuation-in-part of application No. 11/823,818, filed on Jun. 28, 2007, now Pat. No. 7,780,086.

(51) Int. Cl.
*G06K 7/10*    (2006.01)

(52) U.S. Cl. .......... 235/462.42; 235/462.41; 235/462.43

(58) Field of Classification Search . 235/462.01–462.49
See application file for complete search history.

(56) References Cited

U.S. PATENT DOCUMENTS

| | | |
|---|---|---|
| 4,613,895 A | 9/1986 | Burkey et al. |
| 4,794,239 A | 12/1988 | Allais |
| 5,059,779 A | 10/1991 | Krichever et al. |
| 5,124,539 A | 6/1992 | Krichever et al. |
| 5,200,599 A | 4/1993 | Krichever et al. |
| 5,304,786 A | 4/1994 | Pavlidis et al. |
| 5,559,562 A | 9/1996 | Ferster |
| 5,703,349 A | 12/1997 | Meyerson et al. |
| 5,717,195 A | 2/1998 | Feng et al. |
| 6,141,062 A | 10/2000 | Hall et al. |
| 6,924,807 B2 | 8/2005 | Ebihara et al. |
| 7,076,097 B2 | 7/2006 | Kondo et al. |

(Continued)

FOREIGN PATENT DOCUMENTS

WO    2009006419    1/2009

OTHER PUBLICATIONS

International Preliminary Report on Patentability dated Jan. 14, 2010 in related case PCT/US2008/068810.

*Primary Examiner* — Thien M. Le
*Assistant Examiner* — Christle Marshall

(57) ABSTRACT

A bioptical workstation includes plural image capture modules for capturing images of indicia along different fields of view. Each module includes an illuminator for illuminating the indicia with illumination light, a megapixel imager with a rolling shutter for sequentially capturing the return light, and a shutter element for passing the return light to its imager in an open state, and for blocking the return light from other modules from reaching its imager in an closed state. A controller prevents interference among the modules by controlling the shutter element to assume the open state only during a respective exposure time period during which its imager produces an electrical signal indicative of the indicia, and by controlling the shutter element to assume the closed state at all times other than the respective exposure time period to prevent capture of the return light from the other modules.

16 Claims, 5 Drawing Sheets

U.S. PATENT DOCUMENTS

| | | |
|---|---|---|
| 7,116,353 B2 | 10/2006 | Hobson et al. |
| 7,191,947 B2 | 3/2007 | Kahn et al. |
| 7,280,124 B2 | 10/2007 | Laufer et al. |
| 7,430,682 B2 | 9/2008 | Carlson et al. |
| 7,533,819 B2 * | 5/2009 | Barkan et al. ............ 235/462.09 |
| 2004/0146211 A1 | 7/2004 | Knapp et al. |
| 2005/0259746 A1 | 11/2005 | Shinde et al. |
| 2006/0180670 A1 * | 8/2006 | Acosta et al. ............ 235/462.31 |
| 2007/0079029 A1 | 4/2007 | Carlson et al. |
| 2008/0122969 A1 * | 5/2008 | Alakarhu ............ 348/362 |
| 2010/0165160 A1 * | 7/2010 | Olmstead et al. ............ 348/296 |

* cited by examiner

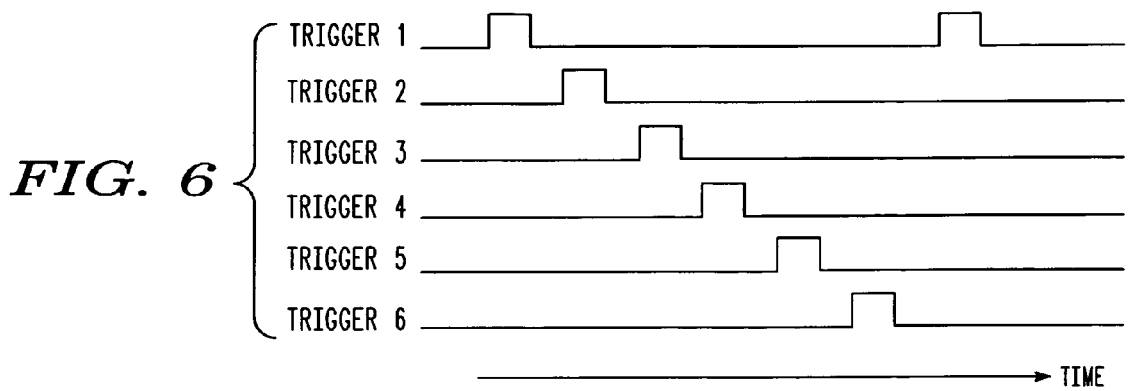
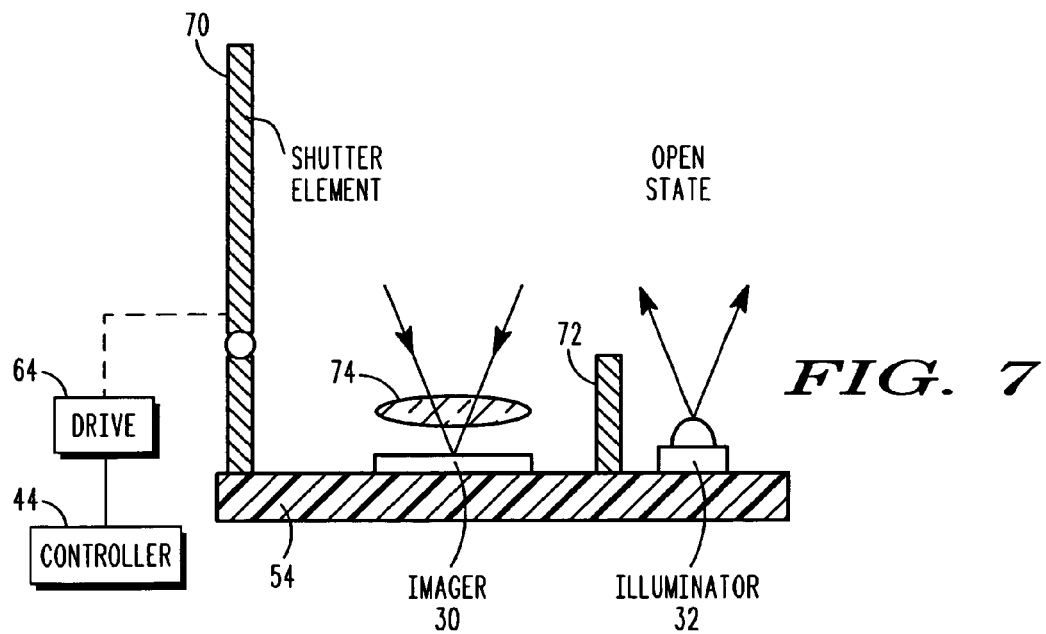
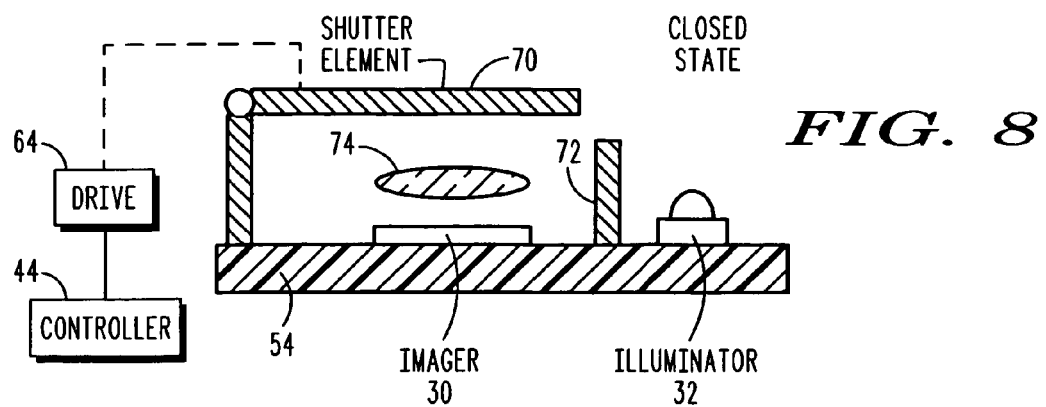

ELECTRO-OPTICAL IMAGING READER HAVING PLURAL SOLID-STATE IMAGERS WITH SHUTTERS TO PREVENT CONCURRENT EXPOSURE

CROSS REFERENCE TO RELATED APPLICATION

This application is a continuation-in-part of U.S. patent application Ser. No. 11/823,818, filed Jun. 28, 2007, now U.S. Pat. No. 7,780,086.

BACKGROUND OF THE INVENTION

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. No. 5,059,779; U.S. Pat. No. 5,124,539 and U.S. Pat. No. 5,200,599, a single, horizontal window is set flush with, and built into, a horizontal countertop of the workstation. Products to be purchased bear an identifying symbol and are typically slid across the horizontal window through which a multitude of scan lines is projected in a generally upwards direction. When at least one of the scan lines sweeps over a symbol associated with a product, the symbol is processed and read.

The multitude of scan lines is generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the horizontal window as a scan pattern of the scan lines.

It is also known to provide a point-of-transaction workstation not only with a generally horizontal window, but also with an upright or generally vertical window that faces an operator at the workstation. The upright window is oriented generally perpendicularly to the horizontal window, or is slightly rearwardly or forwardly inclined. The laser scan pattern generator within this dual window or bioptical workstation also projects the multitude of scan lines in a generally outward direction through the upright window toward the operator. The generator for the upright window can be the same as, or different from, the generator for the horizontal window. The operator slides the products past either window, e.g., from right to left, or from left to right, in a "swipe" mode. Alternatively, the operator merely presents the symbol on the product to an approximate central region of either window in a "presentation" mode. The choice depends on operator preference or on the layout of the workstation.

Each product must be oriented by the operator with the symbol facing away from the operator and generally towards either window of the bioptical workstation. Hence, the operator cannot see exactly where the symbol is during scanning. In typical "blind-aiming" usage, it is not uncommon for the operator to repeatedly swipe or present a single symbol several times before the symbol is successfully read, thereby slowing down transaction processing and reducing productivity.

The blind-aiming of the symbol is made more difficult because the position and orientation of the symbol are variable. The symbol may be located either low or high, or right or left, on the product, or anywhere in between, or on any of six sides of a box-shaped product. The symbol may be oriented in a "picket fence" orientation in which the elongated parallel bars of the one-dimensional UPC symbol are vertical, or in a "ladder" orientation in which the symbol bars are horizontal, or at any orientation angle in between.

In such an environment, it is important that the laser scan lines located at, and projected from, either window provide a full coverage scan zone which extends down as close as possible to the countertop, and as high as possible above the countertop, and as wide as possible across the width of the countertop. The scan patterns projected into space in front of the windows grow rapidly in order to cover areas on products that are positioned not on the windows, but several inches therefrom. The scan zone must include scan lines oriented to read symbols positioned in any possible way across the entire volume of the scan zone.

As advantageous as these laser-based, point-of-transaction workstations have been in processing transactions involving products associated with one-dimensional symbols each having a row of bars and spaces spaced apart along one direction, the workstations cannot process stacked symbols, such as Code 49 which introduced the concept of vertically stacking a plurality of rows of bar and space patterns in a single symbol, as described in U.S. Pat. No. 4,794,239, or PDF417 which increased the amount of data that could be represented or stored on a given amount of surface area, as described in U.S. Pat. No. 5,304,786, or two-dimensional symbols.

Both one- and two-dimensional symbols, as well as stacked symbols, can also be read by employing solid-state imagers which have a one-dimensional array or a single row, or a two-dimensional array or multiple rows, of cells or photosensors that correspond to image elements or pixels in a field of view of the imager. Such an imager may include a one- or two-dimensional charge coupled device (CCD) or a complementary metal oxide semiconductor (CMOS) device, as well as associated circuits for producing electronic signals corresponding to the one- or two-dimensional array of pixel information over the field of view.

It is therefore known to use a solid-state imager for capturing a monochrome image of a symbol as, for example, disclosed in U.S. Pat. No. 5,703,349. It is also known to use a solid-state imager with multiple buried channels for capturing a full color image of a target as, for example, disclosed in U.S. Pat. No. 4,613,895. It is common to provide a two-dimensional CCD with a 640×480 resolution commonly found in VGA monitors, although other resolution sizes are possible.

It is also known to install the solid-state imager, analogous to that conventionally used in a consumer digital camera, in a bioptical, point-of-transaction workstation, as disclosed in U.S. Pat. No. 7,191,947, in which the dual use of both the solid-state imager and the laser scan pattern generator in the same workstation is disclosed. It is possible to replace all of the laser scan pattern generators with solid-state imagers in order to improve reliability and to enable the reading of two-dimensional and stacked symbols, as well as other targets.

However, it was thought that an overall imager-based reader would require about ten to twelve imagers in order to read a symbol that could be positioned anywhere on all six sides of a product. To be successful in the marketplace, as disclosed in commonly-assigned U.S. patent application Ser. No. 11/823,818, filed Jun. 28, 2007, the entire contents of which are incorporated herein by reference thereto, an all imager-based reader must eliminate the need for so many imagers to bring the cost of all the imagers, as well as the cost of each imager, down to an acceptable level, and it must also match, or at least be comparable to, the working range, processing speed, productivity and performance of a laser-based reader. In the case of a bioptical workstation having dual windows, the all imager-based reader must use similar window sizes and must also be able to scan anywhere across the windows and over a comparable working range as that of a laser-based reader, so that operators can achieve the high scanning productivity they have come to expect without any need to learn a new scanning technique.

As advantageous as the all imager-based bioptic reader can be in reading symbols, as disclosed in commonly-assigned U.S. patent application Ser. No. 12/220,333, filed Jul. 23, 2008, the entire contents of which are incorporated herein by reference thereto, interference or crosstalk among the imagers can occur if any two imagers are simultaneously operative. Each imager includes an illuminator for illuminating the symbol with illumination light from one or more illumination light sources, e.g., light emitting diodes (LEDs). A controller is operative for controlling each illuminator to illuminate the symbol, and for controlling each imager to capture the illumination light returning from the symbol over an exposure time period to produce electrical signals indicative of the symbol being read. Each illuminator is only operative during the exposure time period. The illumination light is typically folded by field mirrors to be reflected and captured through the windows.

If the exposure time periods from any two imagers are concurrent, then interference or crosstalk among the illuminators can be caused by multiple internal reflections from the field mirrors within the reader. The illuminated image being captured by any one imager may be corrupted by light associated with another imager. Also, the possibility of uneven illumination could occur if more than one set of illumination LEDs is energized at the same time. In addition, the peak current consumption of the entire reader may be too high if more than one set of illumination LEDs are energized at the same time.

To prevent such concurrent exposure time periods from any two imagers, preferably each having a wide VGA (WVGA) resolution, e.g., 800×480, 848×480, or 854×480, wider than VGA, it is known to configure each imager with a global shutter. With a global/synchronous shutter, all rows in the array are reset and then exposed simultaneously for a specified exposure time period. The global shutter is synchronized with the illuminator. The global shutter exposes the entire imager simultaneously. An entire frame is exposed and begins gathering light. When the specified exposure time period has elapsed, the imager stops gathering light and turns its current exposure into an electronic image. At the start of an exposure, the entire imager starts gathering light. At the end of the exposure, the light-gathering circuitry is electronically turned off, and the contents of the imager are then read out and processed to generate an image.

Although WVGA imagers with global shutters can work in the all imager-based bioptic reader, mega-pixel (MP) imagers are preferred, because they provide a much higher resolution, as well as an enhanced capability of reading symbols of high density. MP imagers with global shutters are available, but at a prohibitively high cost, especially when multiple imagers are required in the reader. MP imagers with rolling shutters are available at a much lower cost, but a rolling shutter exposes different rows or portions of the imager at different points in time, "rolling" through the frame. Different portions of the imager become light-sensitive at different moments in time, and this process sequentially proceeds down or across the course of the full frame, until the entire imager is exposed. This rolling action, however, can cause undesirable exposure at each imager to illumination from other illumination light sources from the other imagers, thereby degrading the captured image by such crosstalk. Accordingly, it would be desirable to use MP imagers with rolling shutters, but without the drawback of imager crosstalk.

SUMMARY OF THE INVENTION

One feature of this invention relates, briefly stated, to a reader for, and a method of, electro-optically reading indicia, comprising a plurality of controllable image capture modules at a housing and operative for capturing images of the indicia along different fields of view. Each module includes an illuminator for illuminating the indicia with illumination light. Each module further includes a solid-state imager with a rolling shutter for sequentially capturing return illumination light from the indicia. Preferably, the imager is a two-dimensional array of megapixel size for increased resolution and enhanced capability for reading indicia, such as symbols of high density. Each module still further includes a shutter element for passing the return illumination light from its illuminator to its imager in an open state, and for blocking the return illumination light from other illuminators of other modules from reaching its imager in a closed state. Preferably, each shutter element is a physical device movable between the open and the closed states. Advantageously, the physical device is a hinged gate mounted on each module for pivoting movement between the open and the closed states.

In accordance with an aspect of this invention, a controller prevents interference among the modules by controlling the shutter element of a respective module to assume the open state only during a respective exposure time period during which the illuminator of the respective module illuminates the indicia, and the shutter element allows the return illumination light from the illuminator of the respective module to pass to the imager of the respective module to capture the passed return illumination light and to produce an electrical signal indicative of the image of the indicia being captured, and by controlling the shutter element of the respective module to assume the closed state at all times other than the respective exposure time period to block the return illumination light from the illuminators of the other modules other than the respective module. Preferably, the controller is operative for moving each shutter element between the open and the closed states.

In a preferred embodiment, the housing has one window located in a generally horizontal plane, and another window located in a generally upright plane that intersects the generally horizontal plane, thereby comprising a bioptical workstation. The modules capture the return illumination light from the indicia through at least one of the windows. The return illumination light preferably travels along respective folded optical paths within the housing to the respective modules. Folding optics, such as stationary field mirrors, are operative for folding the optical paths within the housing.

Advantageously, a first sub-plurality, e.g., three, of the modules captures the return illumination light from the indicia through one of the windows, and a second sub-plurality, e.g., another three, of the modules captures the return illumination light from the indicia through another of the windows. Each sub-plurality of the modules captures the return illumination light from the indicia over the different fields of view that intersect one another.

In accordance with another feature of this invention, the method of electro-optically reading indicia is performed by capturing images of the indicia along different fields of view with a plurality of controllable image capture modules at a housing, illuminating the indicia with illumination light by controlling an illuminator at each module, sequentially capturing return illumination light from the indicia by controlling a solid-state imager with a rolling shutter at each module, controlling a shutter element at each module between an open state and a closed state, and preventing interference among the modules by controlling the shutter element of a respective module to assume the open state only during a respective exposure time period during which the illuminator of the respective module illuminates the indicia, and the shutter element allows the return illumination light from the illuminator of the respective module to pass to the imager of the respective module to capture the passed return illumination light and to produce an electrical signal indicative of the image of the indicia being captured, and by controlling the shutter element of the respective module to assume the closed state at all times other than the respective exposure time period to block the return illumination light from the illuminators of the other modules other than the respective module.

Hence, an all imager-based reader has been proposed that matches, or at least is comparable to, the working range, processing speed, productivity and performance of the laser-based reader. In the case of a bioptical workstation having dual windows, the all imager-based reader uses similar window sizes, and the indicia is able to be scanned anywhere across the windows and over a comparable working range as that of the laser-based reader, so that operators can achieve the high scanning productivity they have come to expect without any need to learn a new scanning technique.

Interference among the modules cannot occur despite the sequential image capture of the megapixel imagers with rolling shutters, because the exposure time periods of no two modules are simultaneous. The open and closed states of each shutter element mimics the functionality of a global shutter. Typical exposure time periods are 300 microseconds or less, and it takes about 16 milliseconds to transfer the image out of the imager. The image being captured by any one module is not degraded or corrupted by illumination generated at the other modules.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 6 is a timing diagram of nonconcurrent trigger signals used in the control circuit of FIG. 5;

FIG. 7 is a schematic view of a representative imaging module with a shutter element in an open state; and FIG. 8 is a schematic view of the representative imaging module of FIG. 7 with the shutter element in a closed state.

DETAILED DESCRIPTION OF THE PREFERRED EMBODIMENTS

Figure 1:
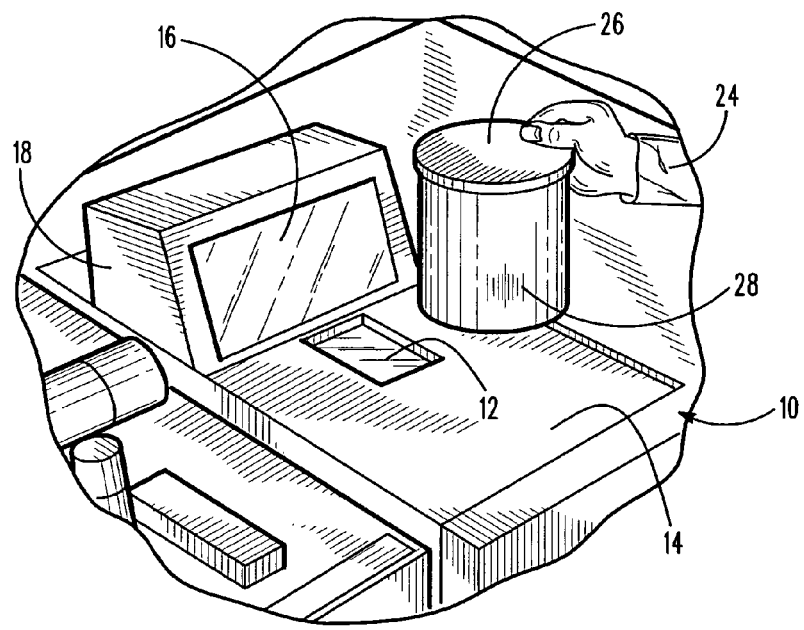
FIG. 1 is a perspective view of a dual window, bioptical, point-of-transaction workstation or reader operative for reading indicia in accordance with this invention.

FIG. 1 depicts a dual window, bioptical, point-of-transaction workstation 10 used by retailers to process transactions involving the purchase of products bearing an identifying target, such as the UPC symbol described above. Workstation 10 has a generally horizontal window 12 set flush with, or recessed into, a countertop 14, and a vertical or generally vertical (referred to as "vertical" or "upright" hereinafter) window 16 set flush with, or recessed into, a raised housing portion 18 above the countertop.

Figure 2:
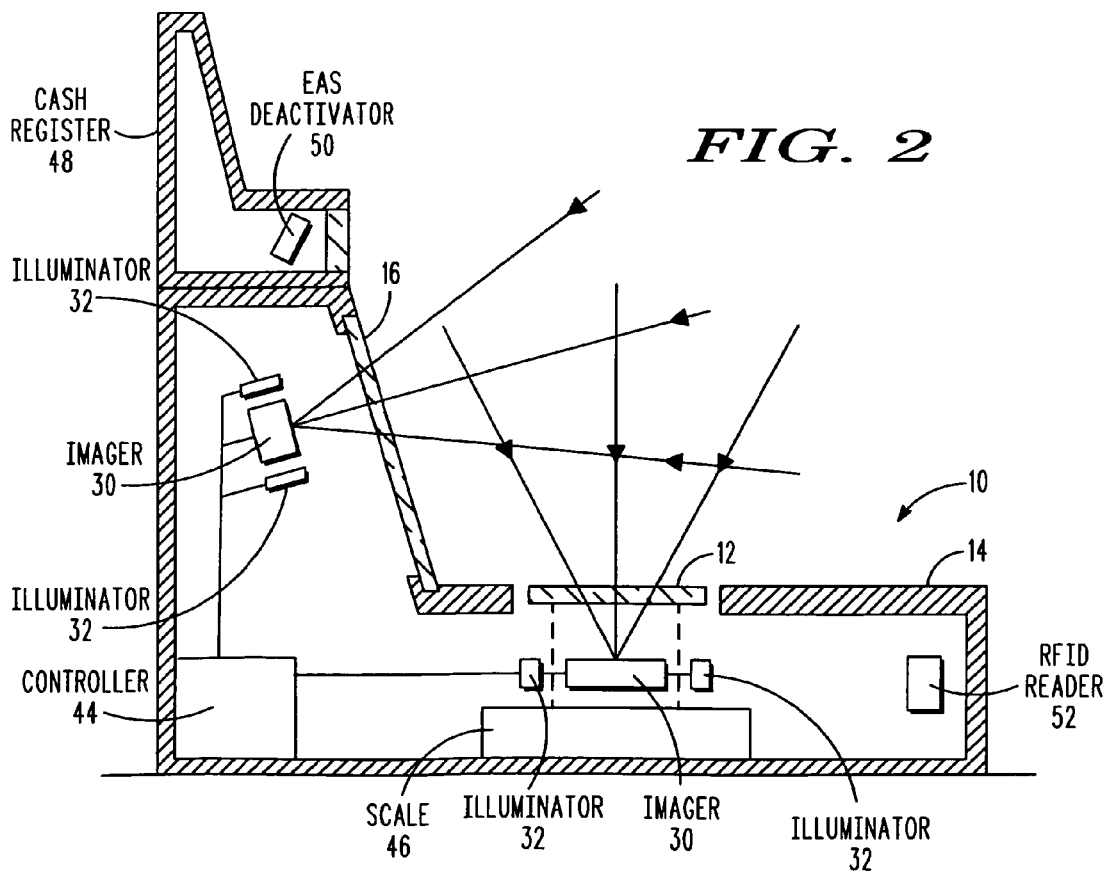
FIG. 2 is a part-sectional, part-diagrammatic, schematic view of a workstation analogous to that shown in FIG. 1.

As schematically shown in FIG. 2, a plurality of imaging modules, each including a solid-state sensor or imager 30 and an illuminator 32, is mounted at the workstation, for capturing return light passing through either or both windows from a target or indicia, which can be a one- or two-dimensional symbol, such as a two-dimensional symbol on a driver's license, or any non-symbol target, as described below. Each imager 30 is a solid-state array, preferably a charge coupled device (CCD) array, or a complementary metal oxide semiconductor (CMOS) array, of megapixel size. Each imager 30 preferably has a rolling shutter, as described above. Each illuminator 32 is preferably one or more light sources, e.g., surface-mounted, light emitting diodes (LEDs), located at each imager 30 to uniformly illuminate the target, as further described below.

In use, an operator 24, such as a person working at a supermarket checkout counter, processes a product 26 bearing a UPC symbol 28 thereon, past the windows 12, 16 by swiping the product across a respective window in the abovementioned swipe mode, or by presenting the product at the respective window in the abovementioned presentation mode. The symbol 28 may be located on any of the top, bottom, right, left, front and rear, sides of the product, and at least one, if not more, of the imagers 30 will capture the illumination light reflected, scattered, or otherwise returning from the symbol through one or both windows. The imagers are preferably looking through the windows at around 45° so that they can each see a side of the product that is generally perpendicular to, as well as generally parallel to, a respective window.

FIG. 2 also schematically depicts that a weighing scale 46, a cash register 48, and an electronic article surveillance (EAS) deactivator 50 are mounted at the workstation. The generally horizontal window 12 advantageously serves not only as a weighing platter for supporting a product to be weighed, but also allows the return light to pass therethrough. The register 48 can sit atop the raised housing portion 18, or be integrated therewith. A radio frequency identification (RFID) reader 52 is also advantageously mounted at the workstation. The reader 52 can be mounted at any location and not only below the countertop 14, as shown.

As also schematically shown in FIG. 2, the imagers 30 and their associated illuminators 32 are operatively connected to a programmed microprocessor or controller 44 operative for controlling the operation of these and other components, such as the shutter elements 70 described below. Preferably, the controller 44 is the same as the one used for decoding the return light scattered from the target and for processing the captured target images.

There are several different types of targets that have particular utility for the enhancement of the operation of the workstation. The target may be a personal check, a credit card, or a debit card presented by a customer for payment of the products being purchased. The operator need only swipe or present these payment targets at one of the windows for image capture.

The target may also be a signature, a driver's license, or the consumer himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products.

The target may be the operator himself or herself, which is used for video surveillance for security purposes. Thus, it can be determined if the operator is actually scanning the products, or passing them around the window in an effort to bypass the window and not charge the customer in a criminal practice known in retailing as "sweethearting".

The target may, of course, be a two-dimensional symbol whose use is becoming more widespread, especially in manufacturing environments and in package delivery. Sometimes, the target includes various lengths of truncated symbols of the type frequently found on frequent shopper cards, coupons, loyalty cards, in which case the area imagers can read these additional symbols.

As previously stated, FIG. 2 is only a schematic representation of an all imager-based reader as embodied in a bioptical workstation. Other housings having different shapes, with one or more windows, are also within the spirit of this invention. A practical depiction of a bioptical workstation in accordance with this invention is shown in FIGS. 3-4, in which all the imaging or image capture modules including their respective imagers, now relabelled 1, 2, 3, 4, 5 and 6, and their respective illuminators 32, as well as other electrical components, such as the shutter elements 70 described below, are commonly mounted on a printed circuit board 54 for joint installation at, and joint removal from, the workstation 10 for ease of serviceability.

Figure 3:
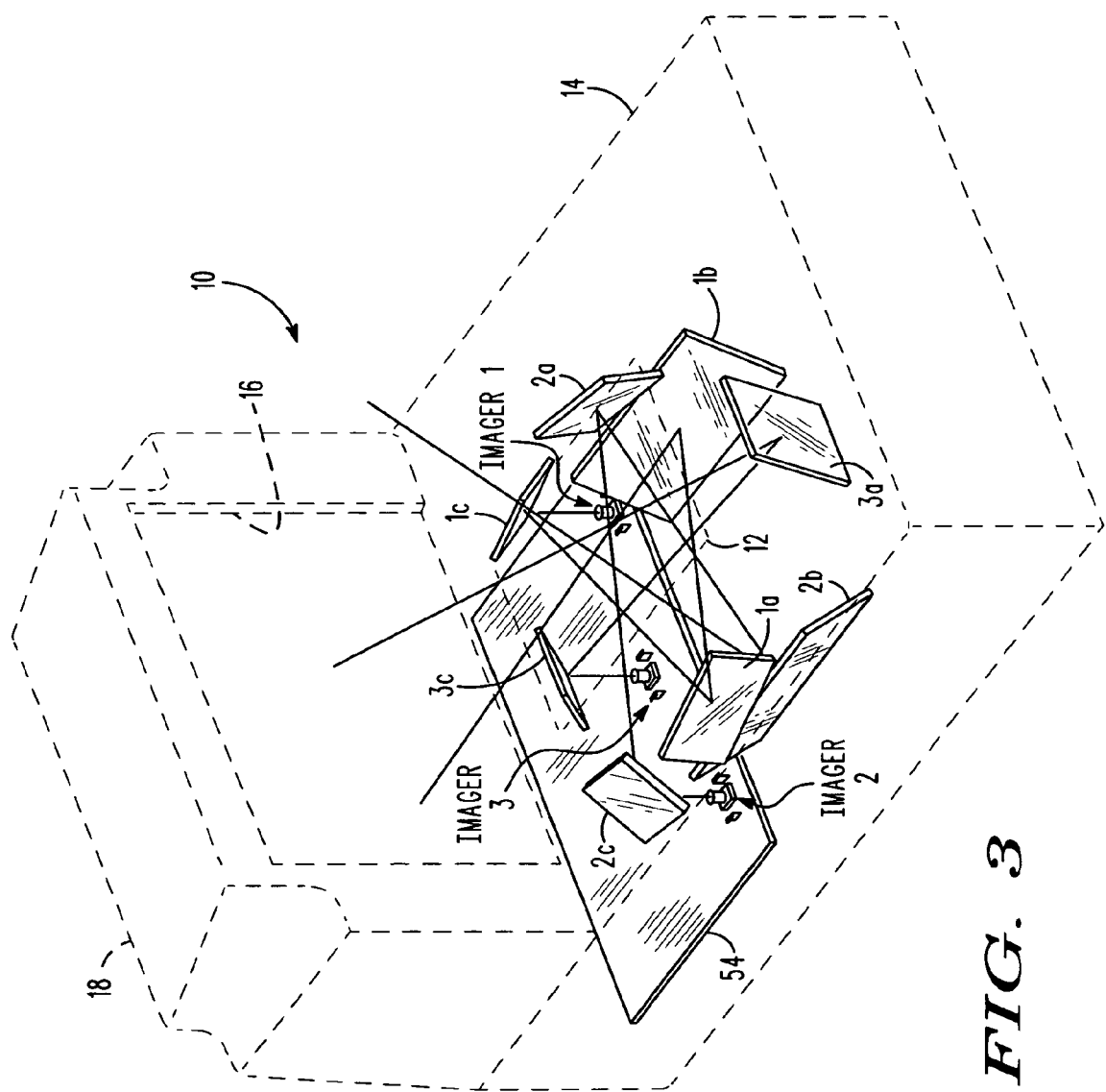
FIG. 3 is a perspective view of a dual window, bioptical, point-of-transaction workstation or reader operative for reading indicia in accordance with this invention using a trio of imaging modules.
Figure 4:
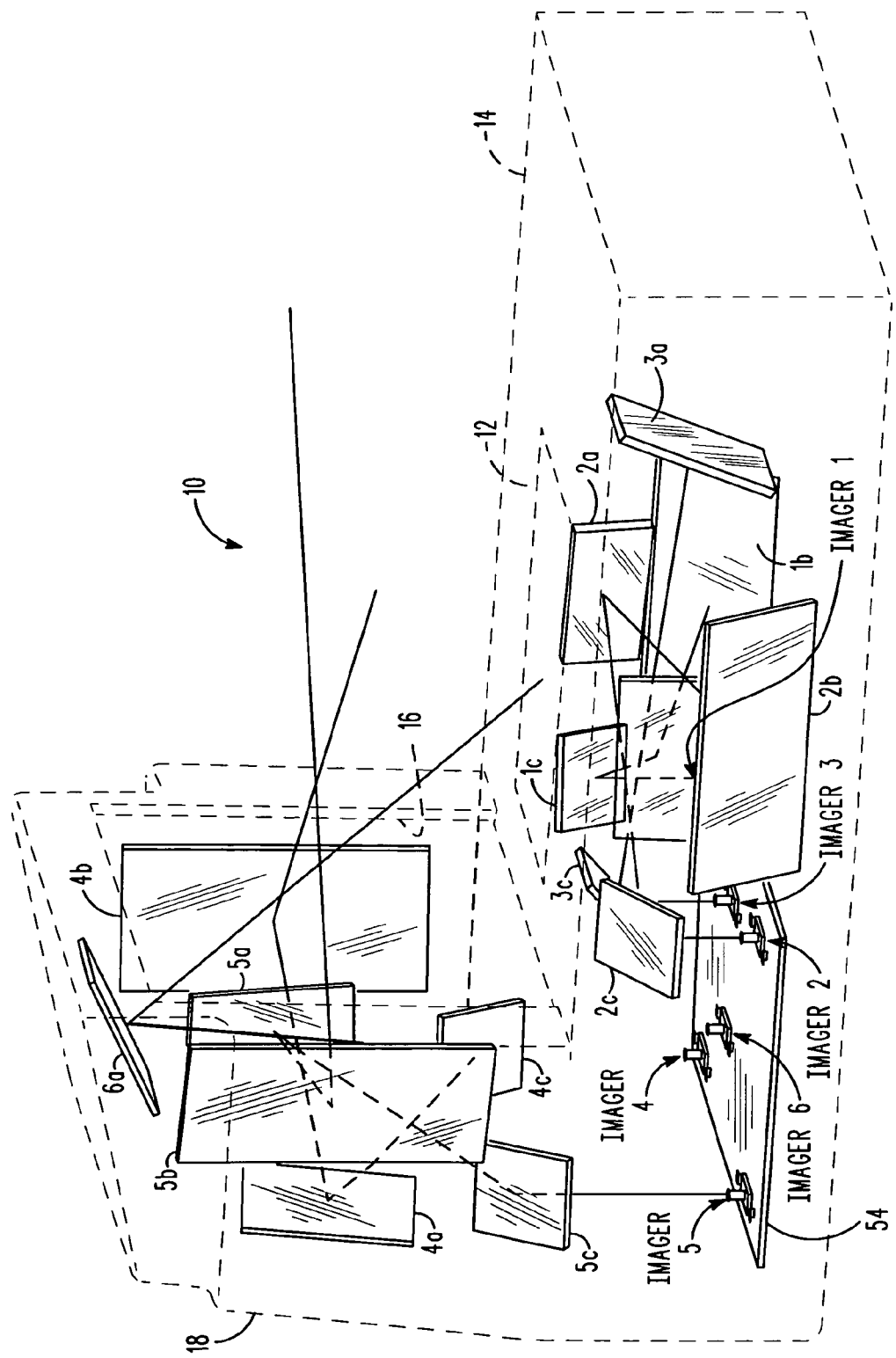
FIG. 4 is a view similar to FIG. 3 of another embodiment of this invention using six imaging modules.

As shown in FIG. 3, the board 54 lies in a generally horizontal plane generally parallel to, and below, the generally horizontal window 12, and imager 1 faces generally vertically upward toward an inclined folding mirror 1c directly overhead at a right side of the window 12. The folding mirror 1c faces another inclined narrow folding mirror 1a located at a left side of the window 12. The folding mirror 1a faces still another inclined wide folding mirror 1b adjacent the mirror 1c. The folding mirror 1b faces out through the generally horizontal window 12 toward the left side of the workstation.

Imager 2 and its associated optics is mirror symmetrical to imager 1 and its associated optics. Imager 2 faces generally vertically upward toward an inclined folding mirror 2c directly overhead at the left side of the window 12. The folding mirror 2c faces another inclined narrow folding mirror 2a located at the right side of the window 12. The folding mirror 2a faces still another inclined wide folding mirror 2b adjacent the mirror 2c. The folding mirror 2b faces out through the generally horizontal window 12 toward the right side of the workstation.

Imager 3 and its associated optics are located generally centrally between imagers 1 and 2 and their associated optics. Imager 3 faces generally vertically upward toward an inclined folding mirror 3c directly overhead generally centrally of the window 12 at one end thereof. The folding mirror 3c faces another inclined folding mirror 3a located at the opposite end of the window 12. The folding mirror 3a faces out through the window 12 in an upward direction toward the raised housing portion 18.

As described so far, a trio of imagers 1, 2 and 3 capture light along different, intersecting fields of view along different directions through the generally horizontal window 12. Turning now to FIG. 4, an additional trio of imagers 4, 5 and 6 capture light along different, intersecting fields of view along different directions through the generally vertical window 16.

More particularly, imager 4 faces generally vertically upward toward an inclined folding mirror 4c directly overhead at a right side of the window 16. The folding mirror 4c faces another inclined narrow folding mirror 4a located at a left side of the window 16. The folding mirror 4a faces still another inclined wide folding mirror 4b adjacent the mirror 4c. The folding mirror 4b faces out through the generally vertical window 16 toward the left side of the workstation.

Imager 5 and its associated optics is mirror symmetrical to imager 4 and its associated optics. Imager 5 faces generally vertically upward toward an inclined folding mirror 5c directly overhead at the left side of the window 16. The folding mirror 5c faces another inclined narrow folding mirror 5a located at the right side of the window 16. The folding mirror 5a faces still another inclined wide folding mirror 5b adjacent the mirror 5c. The folding mirror 5b faces out through the generally vertical window 16 toward the right side of the workstation.

Imager 6 and its associated optics are located generally centrally between imagers 4 and 5 and their associated optics. Imager 6 faces generally vertically upward toward an inclined folding mirror 6a directly overhead generally centrally of the window 16 at an upper end thereof. The folding mirror 6a faces out through the window 16 in a downward direction toward the countertop 14.

In the preferred embodiment, as noted above, each imager has an associated set of LEDs 32 that illuminate the indicia. The LEDs 32 include lenses (not shown) that concentrate the LED illumination light of each illuminator into a solid angle that approximately matches the field of view of each imager. The illumination for each imager is reflected off of the same folding mirrors as the field of view of its associated imager.

The all imager-based reader described herein is capable of reading indicia located anywhere on all six sides of a product, and to do so within a large scan volume over a relatively long working range. For enhanced resolution and decodability of symbols of high density, imagers having megapixel sizes are preferred. However, as discussed above, to minimize the cost of the individual megapixel imagers, a rolling shutter is employed, which is operative for sequentially capturing each image of the indicia. This sequential capture, however, can cause undesirable exposure at each imager to illumination from other illumination light sources from the other imagers, thereby degrading and ruining the captured image by such crosstalk.

In accordance with an aspect of this invention, as best seen in FIGS. 7-8, a representative imaging module has a representative imager 30, a representative illuminator 32, a representative light baffle 72 located between the imager 30 and the illuminator 32, and an imaging lens 74 for capturing and projecting the return illumination light on the imager 30. Each such representative imaging module still further includes a shutter element 70 for passing the return illumination light from the illuminator 32 to the imager 30 of a respective module in an open state (FIG. 7), and for blocking the return illumination light from the illuminator 32 of other modules from reaching the imager 30 of the respective module in a closed state (FIG. 8). Preferably, each shutter element 70 is a physical or mechanical device movable between the open and the closed states. Advantageously, the physical device is a hinged gate mounted on the associated module or on the board 54 for pivoting movement between the open and the closed states.

The controller 44 prevents interference among the modules by controlling a respective shutter element 70 to assume the open state only during a respective exposure time period during which a respective module is controlled to produce an electrical signal indicative of the image of the indicia being captured, and also by controlling the respective shutter element 70 to assume the closed state at all times other than the respective exposure time period to prevent capture of the return illumination light from the other modules other than the respective module. Preferably, the controller 44 is operative for moving each shutter element 70 between the open and the closed states via a drive 64.

Hence, interference among the modules cannot occur despite the sequential image capture of the megapixel imagers with rolling shutters, because the exposure time periods of no two modules are simultaneous. The open and closed states of each shutter element 70 mimics the functionality of a global shutter. Typical exposure time periods are 300 microseconds or less, and it takes about 16 milliseconds to transfer the image out of the imager. The image being captured by any one module is not corrupted by illumination generated at the other modules.

In many locations, the indicia can be seen by more than one imager. For example, an indicium located flat against the horizontal window 12 can be seen by both imager 1 and imager 2. These two imagers look at the indicium from different angles, and their associated illuminators 32 illuminate the indicium from different angles. As a result, a glossy indicium which may be obscured by specular reflection from the point of view of one of the imagers 1 or 2 will not be obscured as seen from the position of the other imager 2 or 1, so that the indicium will still be readable. Of course, the reader's capability to read any indicium is increased by its ability to see the indicium with more than one imager, even in situations where specular reflection is not an issue.

Figure 5:
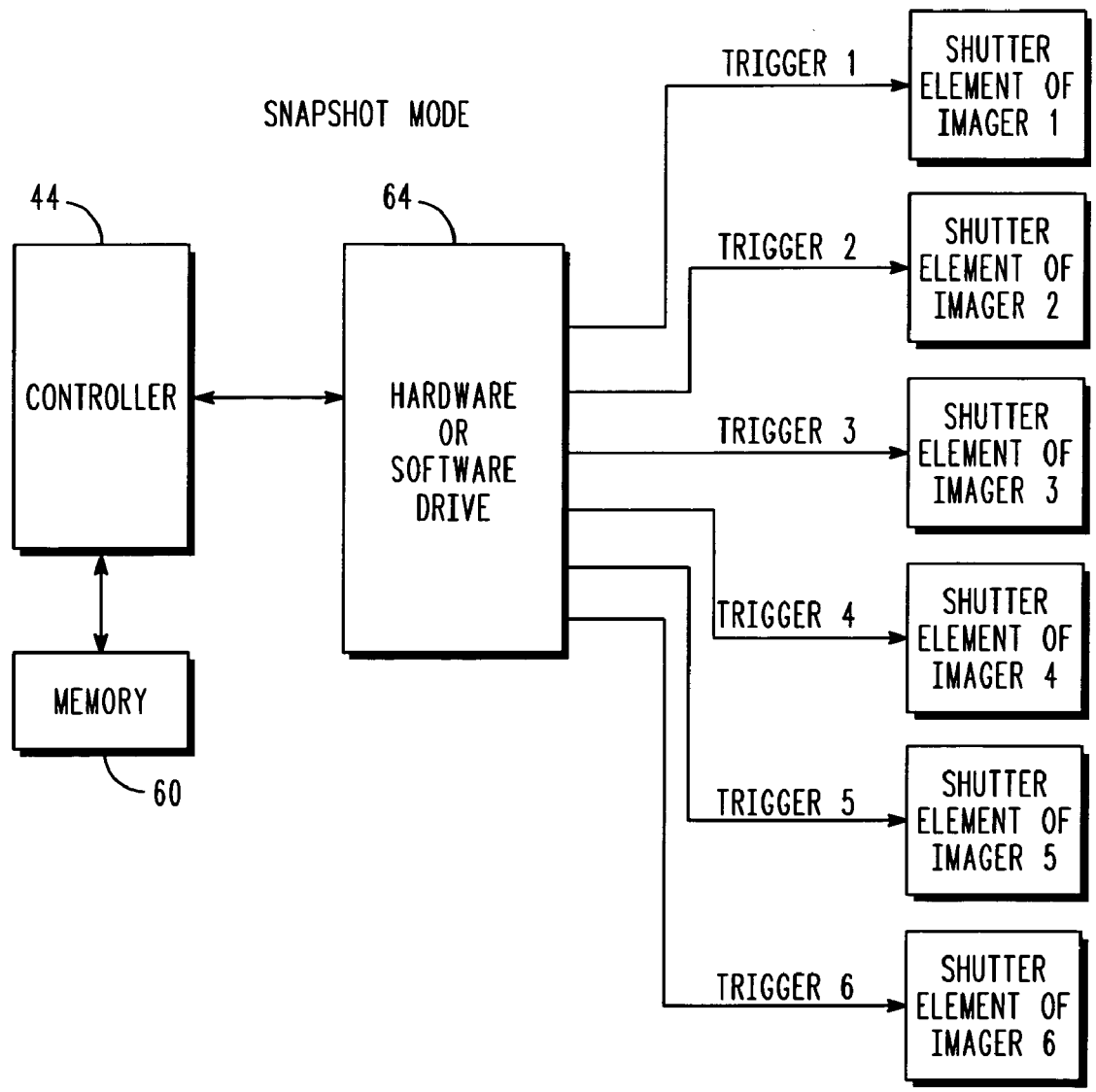
FIG. 5 is a schematic view of a control circuit for controlling shutter elements associated with the imaging modules of the embodiment of FIG. 4 in a snapshot mode of operation.

In operation, according to this invention, the imaging modules will not be capturing images all at the same time. For example, as shown in FIG. 5, a control circuit for preventing interference among the modules includes the aforementioned controller 44, a memory 60 accessible by the controller 44, and a hardware or software circuit or aforementioned drive 64 together operative in a snapshot mode for sequentially activating the respective shutter elements 70 of the imaging modules with respective trigger pulse signals spaced timewise apart in a timing sequence, as best seen in FIG. 6. The trigger pulse signals are nonconcurrent.

Thus, in the snapshot mode, the imager 1 might capture an image first, as permitted by the open state of its associated shutter element 70, and as blocked by the closed state of the other shutter elements 70 of the other imagers. Image capture by the imager 1 may be followed in the same manner by imager 2, imager 3, etc. Each imager will need can exposure time period that is less than about 0.5 milliseconds, and each imager can capture a new image every 16.6 milliseconds or so. Hence, if each imager captures an image approximately every 2.7 milliseconds, all the imagers will capture an image about every 16.6 milliseconds with the exposure time periods of no two imagers being at the same time. The illumination LEDs 32 associated with each imager will only be energized during that imager's exposure time. This eliminates the possibility of uneven illumination that could occur if more than one set of illumination LEDs was energized at the same time. It also minimizes the peak current consumption of the entire reader, by eliminating the need to energize more than one set of illumination LEDs at the same time.

The preferred embodiment shown is for a six-sided reader. Six-sided reading is most commonly used in supermarkets. Department stores and mass merchandisers, however, often use bioptical readers, but do not need a six-sided scanning capability. A less expensive imaging bioptical reader can be created for department stores and mass merchandisers by eliminating one of more imagers. For example, elimination of imagers 3 and 6 will still provide performance adequate for the needs of many department stores.

It will be understood that each of the elements described above, or two or more together, also may find a useful application in other types of constructions differing from the types described above. For example, rather than a mechanical shutter element, the shutter element could be constructed using electrostatically driven LCDs, or microelectromechanical (MEMS) devices. The shutter element need not be movable, but can be a device that is light-transmissive in the open state, and opaque in the closed state. Also, the movement of the shutter element need not only be pivotable as described above, but could be linear or rotatable, or any other movement in which the return illumination light is selectively permitted to pass or be blocked.

While the invention has been illustrated and described as embodied in a point-of transaction workstation for electro-optically reading indicia by using plural megapixel imagers with rolling shutters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading indicia, comprising:
   a housing;
   a plurality of controllable image capture modules at the housing for capturing images of the indicia along different fields of view, each module including an illuminator for illuminating the indicia with illumination light, a solid-state imager with a rolling shutter for sequentially capturing return illumination light from the indicia, and a shutter element controllable between an open state and a closed state; and
   a controller for preventing interference among the modules by controlling the shutter element of a respective module to assume the open state only during a respective exposure time period during which the illuminator of the respective module illuminates the indicia, and the shutter element allows the return illumination light from the illuminator of the respective module to pass to the imager of the respective module to capture the passed return illumination light and to produce an electrical signal indicative of the image of the indicia being captured, and by controlling the shutter element of the respective module to assume the closed state at all times other than the respective exposure time period to block the return illumination light from the illuminators of the other modules other than the respective module.

2. The reader of claim 1, wherein the housing has one window located in a generally horizontal plane, and another window located in a generally upright plane that intersects the generally horizontal plane, and wherein the modules capture the return illumination light from the indicia through at least one of the windows.

3. The reader of claim 2, wherein a first sub-plurality of the modules captures the return illumination light from the indicia through one of the windows, and wherein a second sub-plurality of the modules captures the return illumination light from the indicia through another of the windows, and wherein each sub-plurality of the modules captures the return illumination light from the indicia over the different fields of view that intersect one another.

4. The reader of claim 1, wherein each imager is a two-dimensional array of megapixel size.

5. The reader of claim 1, and optics within the housing for folding the return illumination light to travel along respective folded optical paths within the housing to the respective modules.

6. The reader of claim 1, wherein each shutter element is a physical device movable between the open and the closed states, and wherein the controller is operative for moving each shutter element between the open and the closed states.

7. The reader of claim 6, wherein the physical device is mounted on each module for pivoting movement between the open and the closed states.

8. A reader for electro-optically reading indicia, comprising:
   housing means;
   means including a plurality of controllable image capture modules at the housing means for capturing images of the indicia along different fields of view, each module including an illuminator means for illuminating the indicia with illumination light, a solid-state imager means with a rolling shutter for sequentially capturing return illumination light from the indicia, and a shutter means controllable between an open state and a closed state; and
   means for preventing interference among the modules by controlling the shutter means of a respective module to assume the open state only during a respective exposure time period during which the illuminator means of the respective module illuminates the indicia, and the shutter means allows the return illumination light from the illuminator means of the respective module to pass to the imager means of the respective module to capture the passed return illumination light and to produce an electrical signal indicative of the image of the indicia being captured, and by controlling the shutter means of the respective module to assume the closed state at all times other than the respective exposure time period to block the return illumination light from the illuminator means of the other modules other than the respective module.

9. The reader of claim 8, wherein each shutter means is a physical device movable between the open and the closed states, and wherein the preventing means is operative for moving each shutter means between the open and the closed states.

10. A method of electro-optically reading indicia, comprising the steps of:
    capturing images of the indicia along different fields of view with a plurality of controllable image capture modules at a housing;
    illuminating the indicia with illumination light by controlling an illuminator at each module;
    sequentially capturing return illumination light from the indicia by controlling a solid-state imager with a rolling shutter at each module;
    controlling a shutter element at each module between an open state and a closed state; and
    preventing interference among the modules by controlling the shutter element of a respective module to assume the open state only during a respective exposure time period during which the illuminator of the respective module illuminates the indicia, and the shutter element allows the return illumination light from the illuminator of the respective module to pass to the imager of the respective module to capture the passed return illumination light and to produce an electrical signal indicative of the image of the indicia being captured, and by controlling the shutter element of the respective module to assume the closed state at all times other than the respective exposure time period to block the return illumination light from the illuminators of the other modules other than the respective module.

11. The method of claim 10, and configuring the housing with one window located in a generally horizontal plane, and with another window located in a generally upright plane that intersects the generally horizontal plane, and wherein the capturing step is performed by capturing the return illumination light from the indicia through at least one of the windows.

12. The method of claim 11, wherein the capturing step is performed by capturing the return illumination light from the indicia through one of the windows with a first sub-plurality of the modules, and through another of the windows with a second sub-plurality of the modules, and configuring the different fields of view to intersect one another.

13. The method of claim 10, and configuring each imager as a two-dimensional array of megapixel size.

14. The method of claim 10, and folding the return illumination light to travel along respective folded optical paths within the housing to the respective modules.

15. The method of claim 10, and configuring each shutter element as a physical device movable between the open and the closed states, and moving each shutter element between the open and the closed states.

16. The method of claim 15, and mounting the physical device on each module for pivoting movement between the open and the closed states.

* * * * *

UNITED STATES PATENT AND TRADEMARK OFFICE
CERTIFICATE OF CORRECTION

| | | |
|---|---|---|
| PATENT NO. | : 8,033,472 B2 | Page 1 of 1 |
| APPLICATION NO. | : 12/315235 | |
| DATED | : October 11, 2011 | |
| INVENTOR(S) | : Giebel et al. | |

It is certified that error appears in the above-identified patent and that said Letters Patent is hereby corrected as shown below:

Title Page, under "Primary Examiner", delete "Thin M. Le" and insert -- STEVE S PAIK --, therefor.

In Column 9, Line 56, delete "can" and insert -- an --, therefor.

Signed and Sealed this
Twenty-fifth Day of December, 2012

David J. Kappos
*Director of the United States Patent and Trademark Office*